(12) United States Patent
Dean, Jr. et al.

(10) Patent No.: US 6,547,449 B1
(45) Date of Patent: Apr. 15, 2003

(54) WINDOWLESS, RECTANGULAR FERRULE IN A PREASSEMBLED MULTIFIBER CONNECTOR AND ASSOCIATED ASSEMBLY METHOD

(75) Inventors: David L. Dean, Jr., Hickory, NC (US); James P. Luther, Hickory, NC (US); Joel C. Rosson, Hickory, NC (US); Markus A. Giebel, Hickory, NC (US); Karl M. Wagner, Hickory, NC (US); Thomas Theuerkorn, Hickory, NC (US); Dennis M. Knecht, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/464,815

(22) Filed: Dec. 17, 1999

(51) Int. Cl.[7] ................................................. G02B 6/36
(52) U.S. Cl. ............................ 385/78; 385/79; 385/80; 385/81; 385/82
(58) Field of Search ..................... 385/78, 79, 80–81, 385/82, 83, 84, 85, 56–68, 71, 114

(56) References Cited

U.S. PATENT DOCUMENTS

| 5,727,102 A | * | 3/1998 | Jeong et al. | ................... | 385/59 |
| 5,809,191 A | * | 9/1998 | Stevens et al. | ................ | 385/59 |
| 5,896,479 A | * | 4/1999 | Vladic | .......................... | 385/59 |
| 6,062,740 A | * | 5/2000 | Ohtsuka et al. | ................ | 385/81 |
| 6,129,865 A | * | 10/2000 | Jeong et al. | ................. | 264/1.25 |

* cited by examiner

*Primary Examiner*—Mohammad Sikder

(57) ABSTRACT

A preassembled multifiber connector is provided that includes a connector housing and a windowless multifiber ferrule that is substantially rectangular in lateral cross-section. The windowless multifiber ferrule can be at least partially disposed within an internal cavity defined by the connector housing to thereby form a multifiber connector that is free of optical fibers. Thus, the multifiber connector is capable of being preassembled prior to inserting the plurality of optical fibers into the optical fiber bores defined by the windowless multifiber ferrule. A corresponding method of preassembling a multifiber connector is therefore also provided according to the present invention. A ferrule is also provided that is capable of being selectively converted from a windowless configuration to a windowed configuration. The ferrule of this embodiment includes a ferrule body that not only defines at least one optical fiber bore, but that also defines a well extending through a side surface of the ferrule body. The ferrule body also includes a removable web at least partially covering the well to thereby define the windowless configuration of the ferrule. The web is capable of being selectively removed from the well such that the uncovered well forms a window through the side surface of the ferrule that opens into the at least one optical fiber bore to thereby define a windowed configuration of the ferrule.

13 Claims, 4 Drawing Sheets

WINDOWLESS, RECTANGULAR FERRULE IN A PREASSEMBLED MULTIFIBER CONNECTOR AND ASSOCIATED ASSEMBLY METHOD

FIELD OF THE INVENTION

The present invention relates generally to multifiber ferrules and, more particularly, to windowless, rectangular, multifiber ferrules that are capable of being preassembled into a connector prior to inserting a plurality of optical fibers into the optical fiber bores defined by the ferrule.

BACKGROUND OF THE INVENTION

In the process of connectorizing optical fibers, a ferrule is mounted upon the end portions of one or more optical fibers. Thereafter, the other components of the fiber optic connector, such as the spring, the connector housing, the crimp body, and the crimp band, can be assembled. Although the ferrule is principally disposed within an internal cavity defined by the connector housing, the front portion of the ferrule protrudes beyond the connector housing or is otherwise exposed. Consequently, the end portions of the optical fibers that extend through the optical fiber bores defined by the ferrule and that typically protrude slightly beyond the front surface of the ferrule are also exposed following assembly of the fiber optic connector. By mating a pair of fiber optic connectors such that the front surfaces of the ferrules are either brought into contact or are at least disposed proximate one another, the end portions of the optical fibers upon which the fiber optic connectors are mounted will generally be aligned such that optical signals can pass therebetween with a minimum of attenuation.

Initially, single fiber ferrules were developed for mounting upon individual optical fibers. These single fiber ferrules typically have a cylindrical shape and define a single optical fiber bore extending lengthwise therethrough. In order to mount the single fiber ferrule upon an optical fiber, epoxy is injected into the optical fiber bore defined by the single fiber ferrule and the optical fiber subsequently inserted into the optical fiber bore. Once the epoxy has cured, the single fiber ferrule is securely mounted upon the end portion of the optical fiber.

While single fiber ferrules are extremely useful and commonly utilized in a variety of applications, a growing number of applications demand the optical interconnection of a plurality of optical fibers. As such, multifiber connectors have been developed that include multifiber ferrules for mounting upon the end portions of a plurality of optical fibers to facilitate the interconnection of a plurality of optical fibers. In this regard, Siecor Corporation of Hickory, North Carolina, has developed a fiber optic connector including a generally cylindrical multifiber ferrule designated as an SC-DC ferrule. Although the generally cylindrical multifiber ferrule defines a plurality of optical bores extending lengthwise therethrough, the generally cylindrical multifiber ferrule is assembled much like a single fiber ferrule in that epoxy is injected into the optical fiber bores and the optical fibers are then inserted through the optical fiber bores such that the optical fibers are secured within the generally cylindrical multifiber ferrule once the epoxy has cured.

While a generally cylindrical multifiber ferrule, such as the SC-DC ferrule developed by Siecor Corporation, is advantageous for a variety of applications, a number of applications require that the ferrule have a substantially rectangular shape in lateral cross-section. See, for example, U.S. Pat. No. 5,214,730 assigned to Nippon Telegraph and Telephone Corporation of Tokyo, Japan, that describes a multifiber ferrule having a substantially rectangular shape in lateral cross-section. Like a cylindrical multifiber ferrule, a generally rectangular multifiber ferrule also defines a plurality of optical fiber bores through which the optical fibers extend. Unlike a cylindrical multifiber ferrule, however, epoxy is not initially injected into the optical fiber bores prior to inserting the optical fibers therethrough. Instead, the generally rectangular multifiber ferrule typically defines a window though which at least a medial portion of the optical fiber bores are exposed. As such, the end portions of the optical fibers can first be inserted through the optical fiber bores and epoxy can then be injected through the window defined by the multifiber ferrule so as to secure the end portions of the optical fibers within the multifiber ferrule once the epoxy has cured.

While the injection of epoxy through a window defined by the multifiber ferrule is effective for securing the optical fibers within a generally rectangular multifiber ferrule, the injection of the epoxy through the window defined by the multifiber ferrule generally complicates the assembly process. In this regard, the injection of epoxy through a window defined by the multifiber ferrule creates overflow that must be cleaned out or it will prevent the free floating of the ferrule in relation to the connector. In addition, by defining a window through one of the side surfaces of the multifiber ferrule, the resulting multifiber ferrule is no longer symmetric. As such, extra care must be taken when mounting the multifiber ferrule within a polishing fixture to insure that the side of the multifiber ferrule that defines the window is mounted in a particular orientation relative to the polishing fixture in order to properly hold the multifiber ferrule during polishing operations.

In many instances, it would be desirable to preassemble at least portions of a fiber optic connector. In this regard, the various components of a multifiber connector could be preassembled prior to mounting the fiber optic connector and, in particular, the multifiber ferrule upon the end portions of a plurality of optical fibers. As such, the multifiber connector could be preassembled in a factory setting and then shipped to the field. Once in the field, the preassembled connector could then be more efficiently mounted upon the end portions of a plurality of optical fibers.

Unfortunately, the requirement that epoxy must be injected through the window defined by a rectangular multifiber ferrule after the optical fibers have been inserted through the optical fiber bores prevents the preassembly of rectangular multifiber connector. In this regard, the multifiber ferrule cannot be disposed within the connector housing until after the multifiber ferrule has been mounted upon end portions of the optical fibers and epoxy has been injected through the window defined by the multifiber ferrule since, in at least some instances, the window is no longer exposed once the multifiber ferrule is disposed within the connector housing. Additionally, there is a chance that the epoxy will extend beyond the window, making the ferrule unable to float freely relative to the connector housing either because of the amount of extra epoxy or the epoxy may have secured the ferrule to the housing. Since the connector cannot be preassembled, a number of separate components must be shipped from the factory to the field. A technician must then completely assemble the multifiber ferrule in the field. In this regard, the technician would initially insert the end portions of the optical fiber through the optical fiber bores defined by the multifiber ferrule and then inject epoxy through the window defined by the multifiber ferrule to secure the optical fibers within the multifiber ferrule. Once the epoxy has cured, the technician can assemble the other components of the fiber optic connector about the multifiber ferrule. As will be apparent, this assembly process is relatively time consuming and is made even more so by having to be performed in the field.

While a variety of fiber optic connectors including various ferrules have been developed, the need still exists for improved multifiber connectors and improved methods for assembling a multifiber connector. In this regard, an improved multifiber connector having a generally rectangular shape in lateral cross-section is sought that can be preassembled prior to inserting the end portions of the optical fibers through the plurality of optical fiber bores defined by the multi fiber ferrule. As such, the demands currently placed upon technicians to assemble the multifiber connector in the field would be significantly decreased.

SUMMARY OF THE INVENTION

Accordingly, the present invention is directed to a preassembled multifiber connector that obviates the problems due to limitations and disadvantages of the related art.

In one aspect, the invention includes a multifiber connector being at least partially preassembled that includes a connector housing defining a longitudinal internal cavity and a windowless, multifiber ferrule also extending longitudinally between opposed front and rear surfaces and defining a plurality of optical fiber bores that open through the front surface, wherein said ferrule has a plurality of side surfaces with at least a portion of each side surface being planar such that said ferrule is substantially rectangular in lateral cross-section, each side surface of said ferrule also being a continuous surface so as to be free of any window to the optical fiber bores, and wherein said windowless, multifiber ferrule is at least partially disposed within the internal cavity defined by said connector housing to thereby form the multifiber connector that is free of optical fibers such that the multifiber connector is capable of being preassembled prior to inserting a plurality of optical fibers into the optical fiber bores.

In another aspect, a method of preassembling a multifiber connector is provided that includes a windowless multifiber ferrule that extends longitudinally between opposed front and rear surfaces and defines a plurality of optical fiber bores that open through the front surface, wherein the ferrule has a plurality of side surfaces with at least a portion of each side surface being planar such that the ferrule is substantially rectangular in lateral cross-section, each side surface of the ferrule also being a continuous surface so as to be free of any window to the optical fiber bores, and at least partially disposing the windowless multifiber ferrule within an internal cavity defined by a connector housing to thereby form the multifiber ferrule, said disposition of the windowless multifiber ferrule at least partially within the internal cavity defined by the connector housing occurring prior to inserting a plurality of optical fibers into the optical fiber bores such that the multifiber connector is therefore preassembled.

In yet another aspect, a ferrule is provided that is capable of being selectively converted from a windowless configuration to a windowed configuration, the ferrule includes a ferrule body extending longitudinally between opposed front and rear surfaces and defining at least one optical fiber bore opening through the front surface of the ferrule body, wherein said ferrule body comprises at least one side surface, said side surface defining a well that extends therethrough, and wherein said ferrule body further comprises a removable web at least partially covering the well to thereby define a windowless configuration of the ferrule, said web capable of being selectively removed from the well such that the uncovered well forms a window through the side surface of the ferrule that opens into the at least one optical fiber bore to thereby define a windowed configuration of the ferrule.

It is to be understood that the foregoing general description and the following detailed description are exemplary and explanatory and are intended to provide further explanation of the invention as claimed.

The accompanying drawings are included to provide a further understanding of the invention and are incorporated in and constitute a part of this specification, illustrate several embodiments of the invention, and, together with the description, serve to explain the principles of the invention.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
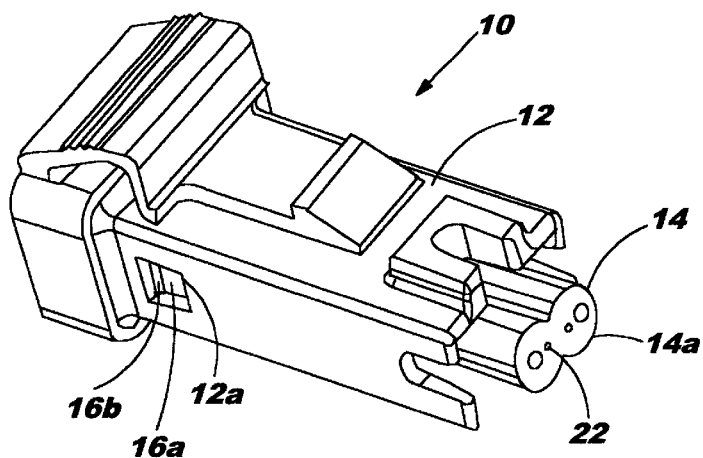
FIG. 1 is a perspective view of a preassembled multifiber connector according to one embodiment of the present invention.
Figure 2:
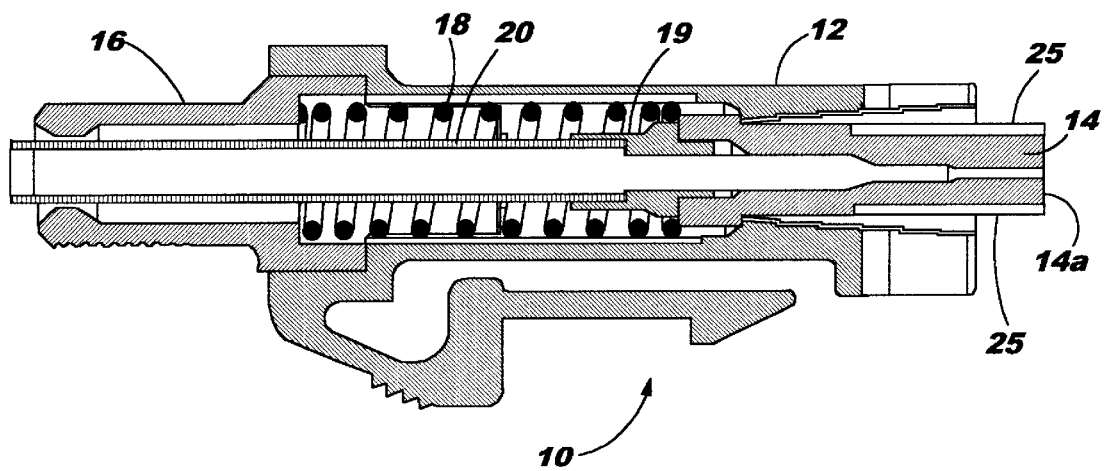
FIG. 2 is a cross-sectional side view of the preassembled multifiber connector of FIG. 1.

As shown in FIGS. 1 and 2, a multifiber connector 10 includes a plurality of components that are assembled upon the end portions of a plurality of optical fiber. The multifiber connector 10 includes a connector housing 12 defining a longitudinally extending internal cavity and a multifiber ferrule 14 that is at least partially disposed within the internal cavity defined by the connector housing 12 once the connector is assembled as shown in FIGS. 1 and 2. As will be described in detail hereinbelow, the multifiber ferrule 14 of the present invention is a windowless ferrule and has a substantially rectangular shape in lateral cross-section. In addition to the multifiber ferrule 14 and the connector housing 12, the multifiber connector 10 of the present invention can also include a crimp body 16 that is operably connected to the connector housing 12 as well as a spring 18 disposed within the internal cavity defined by the connector housing 12 between the crimp body 16 and the ferrule 14 so as to urge the ferrule 14 forwardly relative to the connector housing 12. Although not necessary for the practice of the present invention, the multifiber connector 10 can also include a lead-in tube 20 extending longitudinally through the crimp body 16 and the spring 18 and having one end disposed proximate the rear surface of the ferrule 14 for facilitating insertion of the plurality of optical fibers into the optical fiber bores 22 following preassembly of the connector 10. In instances in which the optical fibers are not ribbonized, the multifiber connector 10 can also include a divider disposed within the lead-in tube that defines a pair (depending on the number of optical fibers to be inserted) of lengthwise extending channels for separating the optical fibers and for leading the optical fibers into the optical fiber bores 22 defined by the multifiber ferrule 14.

According to the present invention, the multifiber connector 10 can be preassembled prior to inserting a plurality of optical fibers into the optical fiber bores 22. In this regard, the multifiber ferrule 14 can be at least partially disposed within the internal cavity defined by the connector housing 12 such that the front surface of the multifiber ferrule 14 is exposed through a front end of the connector housing 12. See FIG. 1. The spring 18 is then disposed within the internal cavity defined by the connector housing 12 such that the forward end of the spring 18 contacts a rear surface of the ferrule 14. While the rear surface of the multifiber ferrule 14 can define features, such as an arcuate recess or an arcuate projection, for engaging the forward end of the spring 18 and for centering the spring 18 relative to the multifiber ferrule 14, the multifiber connector 10 of the present invention can also include an additional spring centering element 19, if so desired. A crimp body 16 is then operably connected to the connector housing 12 in order to sandwich the spring 18 between the crimp body 16 and the ferrule 14, thereby causing the spring 18 to urge the ferrule 14 forwardly relative to the connector housing 12. Typically, the crimp body 16 includes a pair of forwardly extending arms 16a, each of which carries an outwardly extending tab 16b. By inserting the forwardly extending arms into the rear portion of the internal cavity defined by the connector housing 12, the outwardly extending tabs 16b can engage corresponding windows 12a defined by the side walls of the connector housing 12, thereby connecting the crimp body 16 to the connector housing 12. Although not necessary for the practice of the present invention, a lead-in tube 20 can also be inserted through the crimp body 16 and into the spring 18 so as to extend longitudinally therethrough. In this instance, one end of the lead-in tube is disposed proximate the rear surface of the ferrule 14 in order to facilitate the subsequent insertion of the plurality of optical fibers into the optical fiber bores 22 defined by the ferrule 14. If the optical fibers (not shown) that are to be inserted into the optical fiber bores 22 are not ribbonized, a divider can also be disposed within the lead-in tube in order to further separate the optical fibers and to lead the optical fibers into their optical fiber bores 22.

As described above, the multifiber connector 10 of the present invention can therefore be preassembled prior to inserting the plurality of optical fibers into the optical fiber bores 22 defined by the multifiber ferrule 14. As such, the preassembly of the multifiber connector 10 can be efficiently and, in some instances, automatically performed in a factory setting such that the preassembled multifiber connector 10 can then be shipped. Once in the field, the preassembled multifiber connector 10 can be easily mounted upon the end portions of the optical fibers, thereby increasing the efficiency with which optical fibers can be connectorized in the field since each of the components of the multifiber connector 10 need not be assembled in the field. In order to mount the preassembled multifiber connector 10 of the present invention upon the end portions of a plurality of optical fibers in the field, a connector boot (not shown) and a crimp band (not shown) are typically slid over the end portions of the optical fibers. Thereafter, a protective jacket covering the optical fibers is preferably stripped back to expose the end portions of the optical fibers. Epoxy is then ejected, typically via a syringe, through the rear end of the multifiber ferrule 14 and into the optical fiber bores 22. The end portions of the optical fibers are then inserted through the lead-in tube 20 and into respective optical fiber bores 22 defined by the multifiber ferrule 14. Once the epoxy cures, the multifiber ferrule 14 is securely mounted to the end portions of the plurality of optical fibers. To complete the assembly process, the strength members of the fiber optic cable are placed over the crimp body 16 and the crimp band is then slid forwardly along the plurality of optical fibers and over the rear portion of the crimp body 16. By compressing the crimp band about the crimp body 16, the strength members of the fiber optic cable can be secured therebetween. Finally, the connector boot can be slid forwardly along the plurality of optical fibers and at least partially over the crimp band in order to provide additional strain relief for the plurality of optical fibers.

Figure 3:
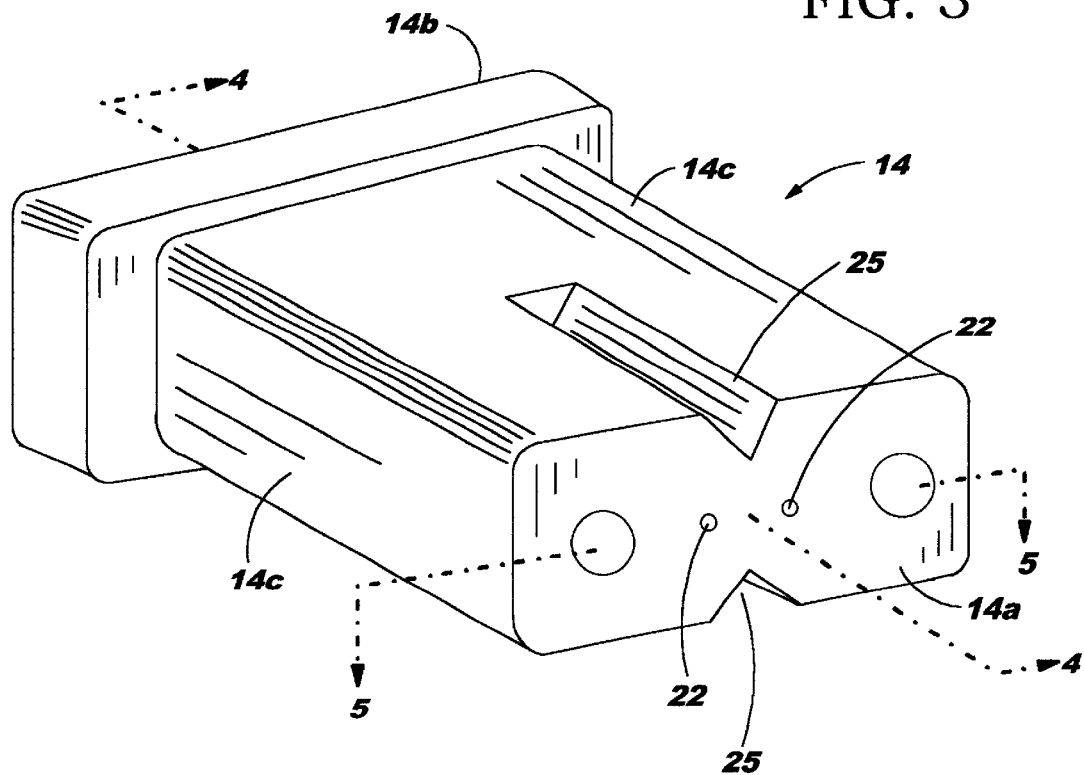
FIG. 3 is a perspective view of the windowless multifiber ferrule of the multifiber connector of FIG. 1 that illustrates the substantially rectangular shape of the windowless multifiber ferrule.
Figure 4:
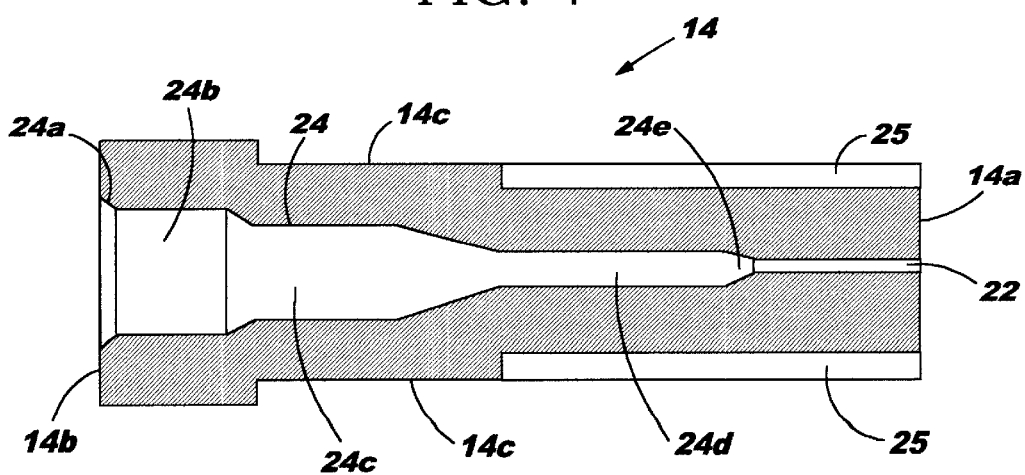
FIG. 4 is a cross-sectional side view of the windowless multifiber ferrule of FIG. 3 taken along the line 4—4 illustrating the internal cavity defined by the ferrule that opens through the rear surface thereof.

As shown in more detail in FIG. 3, the multifiber ferrule 14 of the present invention extends longitudinally between the opposed front and rear surfaces 42a, 14b. In addition, the multifiber ferrule 14 defines a plurality of optical fiber bores 22 that open through the front surface and through which respective optical fibers are inserted as described above. In addition to the front and rear surfaces, the multifiber ferrule 14 has a plurality of side surfaces 14c with at least a portion of each side surface being planar. As such, the multifiber ferrule 14 of the present invention is substantially rectangular in lateral cross-section and is compatible with MT-type connectors. As shown in FIGS. 3 and 4, the forward most portion of the shaft of the multifiber ferrule 14 can define a pair of lengthwise extending grooves 25 for facilitating polishing of the front surface of the ferrule 14. In addition, the corners of the ferrule 14 can be rounded or curved in order to increase the size of the ferrule 14 shoulder and correspondingly improve the seating of the ferrule 14 within the connector housing 12 of a multifiber connector 10. For purposes of the present application, however, the ferrule 14 depicted in FIG. 3 having the curved corners and the lengthwise extending grooves will be considered to be substantially rectangular since at least a portion of each major side surface is planar. Each side surface of the ferrule 14 of this embodiment is also a continuous surface so as to be free of any window that would otherwise open through a side surface of a conventional MTP ferrule and expose the optical fiber bores extending therethrough.

Since the multifiber ferrule 14 of the present invention is windowless, the multifiber ferrule 14 requires that the optical fibers be secured within the multifiber ferrule 14 in some fashion other than by injecting epoxy through a window as in conventional designs. In this regard, epoxy is injected through the opening defined by the rear surface 14b of the ferrule 14 and into the optical fiber bores 22. Although the epoxy can be injected in various manners, the epoxy is typically injected with a syringe. The optical fibers are then inserted into the respective optical fiber bores 22 and are secured therein once the epoxy cures. Thereafter, the front surface 14a of the ferrule 14 and the end portions of the optical fibers can be polished. Accordingly, the multifiber connector 10 of the present invention can be preassembled prior to inserting the plurality of optical fibers into the respective optical fiber bores 22 since the multifiber ferrule 14 of the present invention is windowless and, as such, does not permit epoxy to be inserted through a window as required by conventional MTP ferrules.

Since the optical fibers must be inserted into the respective optical fiber bores 22 following preassembly of the multifiber connector 10 of the present invention, the multifiber ferrule 14 preferably defines an internal cavity 24 that opens through the rear surface 14b and is in communication with the plurality of optical fiber bores 22. The internal cavity is preferably shaped and sized so as to facilitate the insertion of the optical fibers into the respective optical fiber bores 22. As shown in FIGS. 3 and 4, for example, the internal cavity tapers inwardly in a longitudinal direction extending from the rear surface of the ferrule 14 to the front surface 14a of the ferrule 14. As such, the internal cavity defined by the multifiber ferrule 14 is largest proximate the rear surface of the ferrule 14 and is smaller proximate the optical fiber bores 22. Although the internal cavity defined by the multifiber ferrule 14 can have a variety of configurations, the internal cavity of one advantageous embodiment has a stepped configuration that converges in a longitudinal direction extending from the rear surface of the ferrule 14 to the front surface of the ferrule 14.

In one particular embodiment in which the shaft of the ferrule 14 is 4.4 millimeters by 2.45 millimeters and the enlarged rear portion of the ferrule is 3 millimeters by 5.05 millimeters, the portion 24a of the internal cavity 24 proximate the rear surface 14b of the ferrule initially defames a 30° chamfer that leads into a circular section 24b having a diameter of 1.5 millimeters. This first circular section then transitions to a second circular section 24c having a diameter of 1.16 millimeters. The circular geometry of the internal cavity then tapers inwardly at an angle of 15° and transitions into a flat section 24d that, in turn, leads to the typical ribbon-style entry to the optical fiber bores 22. In this regard, the transition from the flat geometry to the optical fiber bores 22 includes a transition region 24e that tapers inwardly at 15° to reduce the effective area of the internal cavity to a size approximating the outside dimensions of the optical fiber bores 22. As such, the plurality of optical fibers can be fed through the internal cavity and inserted into the respective optical fiber bores 22 following preassembly of the connector 10. Since epoxy has been injected into the optical fiber bores 22 prior to inserting the optical fibers through the internal cavity and into the optical fiber bores 22, the windowless multifiber ferrule 14 of the present invention facilitates the preassembly of the multifiber connector 10 prior to inserting the plurality of optical fibers into the optical fiber bores 22.

Figure 5:
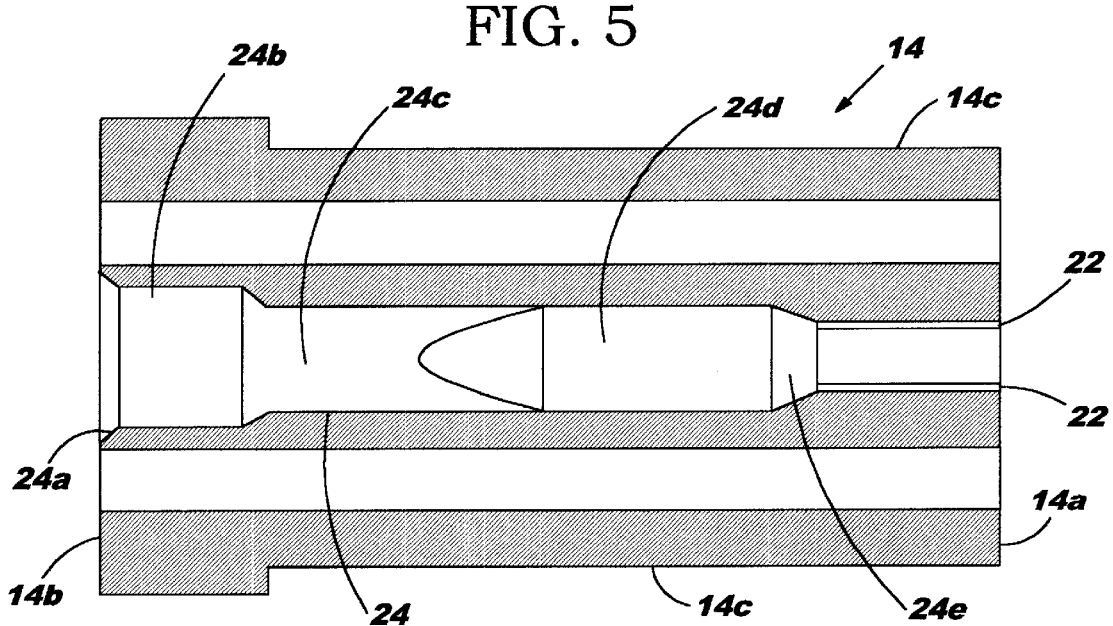
FIG. 5 is a cross-sectional view of the windowless multifiber ferrule of FIG. 3 take along the line 5—5 which also illustrates the internal cavity defined by the windowless multifiber ferrule that opens through the rear surface thereof.
Figure 6:
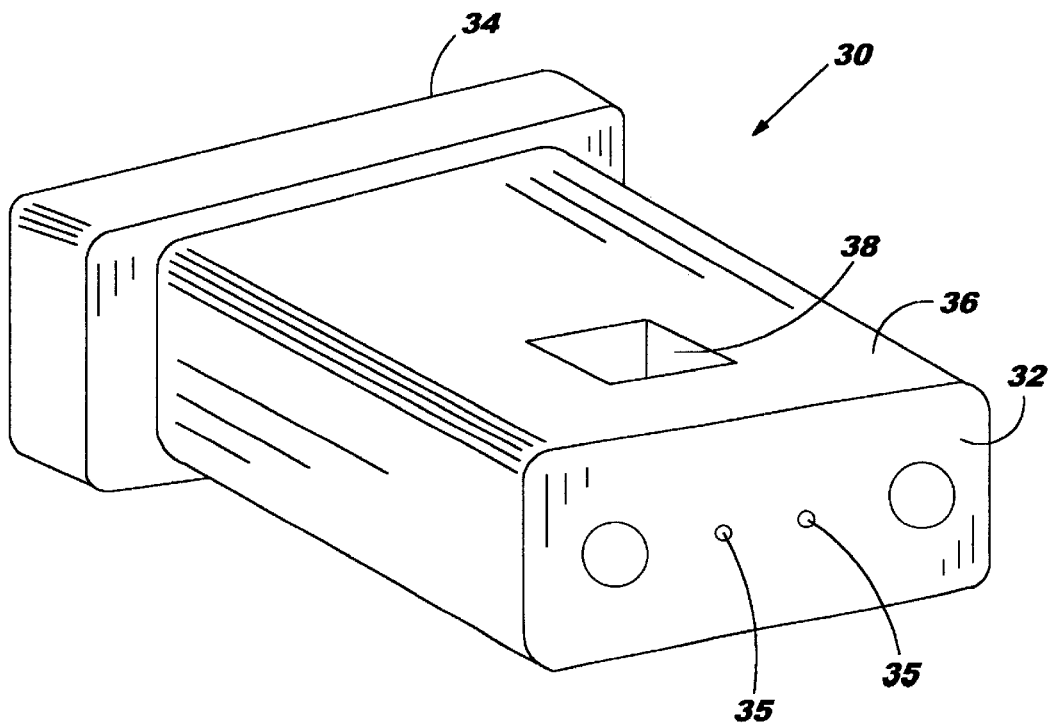
FIG. 6 is a perspective view of a ferrule having a removable web according to another embodiment of the present invention.

While the multifiber ferrule 14 depicted in FIGS. 3–5 is fabricated so as only to have a windowless configuration, a ferrule 30 is also provided according to another aspect of the present invention that is capable of being selectively converted from a windowless configuration to a windowed configuration. As shown in FIG. 6, for example, the ferrule includes a ferrule body extending longitudinally between opposed front and rear surfaces 32, 34 and defining at least one optical fiber bore 35 opening through the front surface of the ferrule body. In addition to the front and rear surfaces 32,34, the ferrule body includes at least one side surface 36.

According to this aspect of the present invention, the side surface defines a well 38 that extends therethrough. While the well 38 can be defined by any portion of a side surface, the well 38 is preferably defined at a location corresponding to the location at which a window is defined by conventional windowed ferrules. In the illustrated embodiment in which the ferrule body defines a substantially rectangular shape in lateral cross-section, the ferrule body preferably defines a well 38 in the medial portion of one of the major side surfaces 36.

Regardless of the location of the well 38, the ferrule body of this aspect of the present invention further includes a removable web 40 at least partially covering the well and, more typically, completely covering the well. As such, the ferrule 30 of this aspect of the present invention defines a windowless configuration in instances in which the web at least partially covers the well. However, the web is capable of being selectively removed from the well such that the uncovered well 38 forms a window through the side surface of the ferrule that opens into the at least one optical fiber bore 35. Once the web has been selectively removed from the well, a windowed configuration of the ferrule is defined. As such, epoxy can be injected through the window defined by the well of the ferrule body in order to secure the optical fibers within the optical fiber bores defined by the ferrule.

While the web 40 can be removed in a variety of fashions, the edge portions 42 of the web that connect the web to the remainder of the ferrule body are preferably broken to thereby separate the web from the remainder of the ferrule body. For example, the web can include a body portion 44 and an edge portion connecting the body portion to the remainder of the ferrule body. In this embodiment, the edge portion is preferably thinner than the body portion to facilitate the selective removal of the web from the well 38. Preferably, the thickness of the edge portion is selected such that the web can be readily removed from the wall upon the application of a predetermined force while preventing the web from being removed from the wall upon most instances of inadvertent contact with the web. For a multifiber ferrule formed of thermoset, the web preferably has a thickness of about 0.5 mm at the edges of the web and is thicker in the middle to allow the entire window to be removed when desired.

Figure 7:
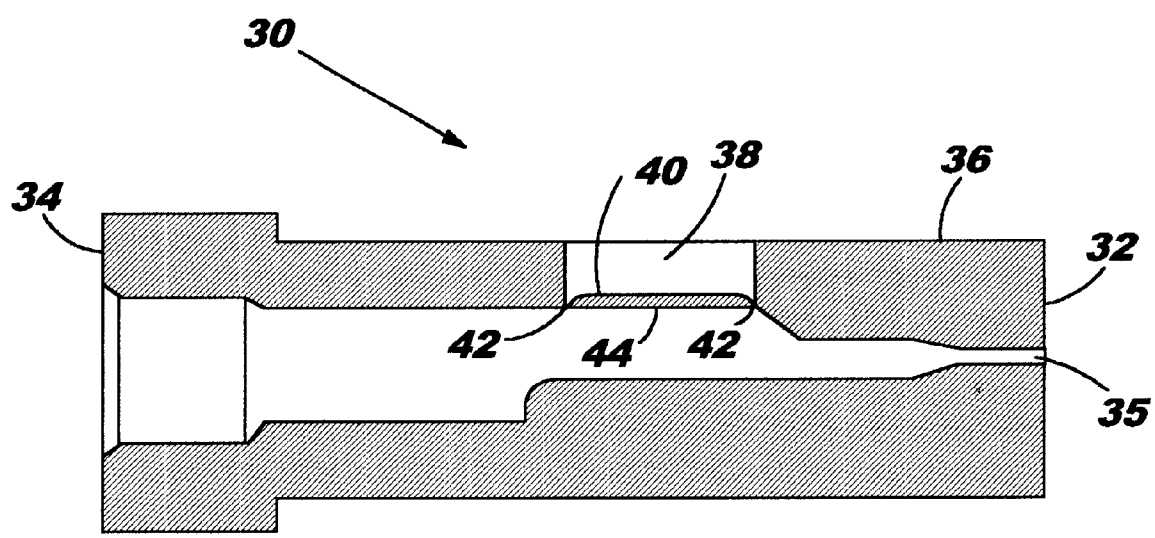
FIG. 7 is a cross-sectional side view of the ferrule having a removable web of FIG. 6 taken along line 7—7.

The removable web 40 can be disposed at any position within a well 38. However, the removable web is typically disposed within a bottom portion of the well proximate the at least one fiber bore 35 as shown in cross-section in FIG. 7. In addition, the well and the corresponding web can have a variety of sizes and shapes. Typically, however, the well and the corresponding web are sized such that the well opens into each of the plurality of optical fiber bores 35 defined by the ferrule in the windowed configuration such that epoxy can be readily inserted into each of the optical fiber bores 35.

According to this aspect of the present invention, the ferrule 30 can be selectively configured in either a windowed configuration or a windowless configuration. Once the web 40 has been removed and the ferrule has a windowed configuration, the ferrule can be utilized as a conventional windowed ferrule to permit epoxy to be injected through the window in order to bond the optical fibers within their respective optical fiber bores 35. However, prior to removing the web from the well 38, the ferrule has a windowless configuration and can be utilized as described above in order to facilitate preassembly of a multifiber connector 10 prior to inserting the plurality of optical fibers into the respective optical fiber bores.

The multifiber connector 10 of one advantageous embodiment of the present invention therefore includes a windowless multifiber ferrule 14 that is substantially rectangular in cross-section and is configured so as to permit the preassembly of the multifiber connector 10 prior to inserting the plurality of optical fibers into the optical fiber bores 22. Thus, the multifiber connector 10 of this embodiment can advantageously be preassembled in the factory and can then be shipped to the field, at which time epoxy is injected and the end portions of the plurality of optical fibers are inserted into the optical fiber bores in order to mount the multifiber connector upon the optical fibers. Moreover, a ferrule 30 is also provided according to another aspect of the present invention that can be selectively converted from a windowless configuration to a windowed configuration in order to be suitable for any of a variety of applications.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A multifiber connector being at least partially preassembled comprising:
    a connector housing defining a longitudinal internal cavity; and
    a windowless, multifiber ferrule also extending longitudinally between opposed front and rear surfaces and defining a plurality of optical fiber bores that open through the front surface,
        wherein said ferrule has a plurality of side surfaces with at least a portion of each side surface being planar such that said ferrule is substantially rectangular in lateral cross-section, each side surface of said ferrule also being a continuous surface so as to be free of any window to the optical fiber bores, and
        wherein said windowless, multifiber ferrule is at least partially disposed within the internal cavity defined by said connector housing to thereby form the multifiber connector that is free of optical fibers such that the multifiber connector is capable of being preassembled prior to inserting a plurality of optical fibers into the optical fiber bores.

2. A preassembled multifiber connector according to claim 1 wherein said ferrule defines an internal cavity that opens through the rear surface and is in communication with the plurality of optical fiber bores, said ferrule defining the internal cavity to taper inwardly in a longitudinal direction extending from the rear surface of said ferrule to the front surface of said ferrule to thereby facilitate insertion of the plurality of optical fibers into the optical fiber bores following preassembly of the connector.

3. A preassembled multifiber connector according to claim 2 wherein said ferrule defines the internal cavity to have a stepped configuration that converges in a longitudinal direction extending from the rear surface of said ferrule to the front surface of said ferrule.

4. A preassembled multifiber connector according to claim 1 further comprising a crimp body operably connected to said connector housing prior to inserting the plurality of optical fibers into the optical fiber bores.

5. A preassembled multifiber connector according to claim 4 further comprising a spring disposed within the internal cavity defined by said connector housing between said crimp body and said ferrule prior to inserting the plurality of optical fibers into the optical fiber bores, said spring urging said ferrule forwardly relative to said connector housing.

6. A preassembled multifiber connector according to claim 5 further comprising a lead-in tube extending longitudinally through said spring and having one end disposed proximate the rear surface of said ferrule prior to inserting the plurality of optical fibers into the optical fiber bores, said lead-in tube facilitating insertion of the plurality of optical fibers into the optical fiber bores following preassembly of the connector.

7. A method of preassembling a multifiber connector comprising:
    providing a windowless multifiber ferrule that extends longitudinally between opposed front and rear surfaces and defines a plurality of optical fiber bores that open through the front surface, wherein the ferrule has a plurality of side surfaces with at least a portion of each side surface being planar such that the ferrule is substantially rectangular in lateral cross-section, each side surface of the ferrule also being a continuous surface so as to be free of any window to the optical fiber bores; and
    at least partially disposing the windowless multifiber ferrule within an internal cavity defined by a connector housing to thereby form the multifiber ferrule, said disposition of the windowless multifiber ferrule at least partially within the internal cavity defined by the connector housing occurring prior to inserting a plurality of optical fibers into the optical fiber bores such that the multifiber connector is therefore preassembled.

8. A method according to claim 7 further comprising inserting the plurality of optical fibers into the optical fiber bores following preassembly of the multifiber connector.

9. A method according to claim 8 further comprising injecting epoxy into the optical fiber bores following preassembly of the multifiber connector and prior to inserting the optical fibers into the optical fiber bores in order to subsequently secure end portions of the optical fibers within the optical fiber bores.

10. A method according to claim 9 wherein the ferrule defines an internal cavity that opens through the rear surface and is in communication with the plurality of optical fiber bores, and wherein injecting epoxy into the optical fiber bores comprises injecting epoxy through the internal cavity that opens through the rear surface of said ferrule and into the optical fiber bores.

11. A method according to claim 7 further comprising operably connecting a crimp body to the connector housing following disposition of the ferrule at least partially within the internal cavity defined by the connector housing and prior to inserting the plurality of optical fibers into the optical fiber bores.

12. A method according to claim 11 further comprising disposing a spring within the internal cavity defined by the connector housing following disposition of the ferrule at least partially within the internal cavity defined by the connector housing and prior to operably connecting the crimp body to the connector housing.

13. A method according to claim 12 further comprising positioning a lead-in tube to extend longitudinally through the spring such that one end of the lead-in tube is proximate the rear surface of the ferrule prior to inserting the plurality of optical fibers into the optical fiber bores.

* * * * *